United States Patent [19]
Walton et al.

[11] Patent Number: 4,569,769
[45] Date of Patent: Feb. 11, 1986

[54] WASTEWATER TREATMENT

[75] Inventors: John R. Walton; Jeffrey A. Rutz, both of Houston, Tex.

[73] Assignee: Interox America, Houston, Tex.

[21] Appl. No.: 624,245

[22] Filed: Jun. 25, 1984

[51] Int. Cl.[4] ................................. C02F 1/72
[52] U.S. Cl. ................................. 210/759; 210/763; 423/544
[58] Field of Search ............... 210/721, 759, 763, 766; 423/224, 242, 544

[56] References Cited
U.S. PATENT DOCUMENTS

| 3,186,942 | 6/1965 | Benger ................... | 210/763 |
| 3,721,624 | 3/1973 | Fisch et al. ............. | 210/759 |
| 4,292,293 | 9/1981 | Johnson et al. .......... | 210/759 |
| 4,321,143 | 3/1982 | Wilms et al. ............ | 210/759 |
| 4,443,342 | 4/1984 | Stas et al. .............. | 210/759 |

FOREIGN PATENT DOCUMENTS

| 50-26762 | 3/1975 | Japan ................... | 210/759 |
| 53-12152 | 2/1978 | Japan ................... | 210/759 |

OTHER PUBLICATIONS

Schumb, et al., *Hydrogen Peroxide*, pp. 398–399, Reinhold Publishing Co. (1955).
Mucenieks, et al., "The Use of Hydrogen Peroxide for the Oxidation of Sulfur Chemical Wastes", Presented at the 7th Middle Atlantic Industrial Waste Conference, Drexel University, Nov. 13, 1974.
Kibble, W. H., "Treating Industrial Wastewater with Hydrogen Peroxide", Plant Engineering, Nov. 15, 1979, pp. 137–140.
Kibble, W. H., "Peroxide Treatment for Industrial Waste Problems", Industrial Water Engineering, Aug.-/Sep. 1976, pp. 6–11.

*Primary Examiner*—Peter Hruskoci
*Attorney, Agent, or Firm*—Larson and Taylor

[57] ABSTRACT

Aqueous alkaline sulfidic waste effluents are often subjected to air oxidation processes that for economic sizing oxidize the sulfides only to thiosulfates. Thiosulfates are still immediate oxygen demanders and thus their concentration in the effluent must normally be reduced to below a threshold level before the effluent can be discharged. The effectiveness of hydrogen peroxide for this purpose can be significantly improved both as to rate of reaction and extent of removal by employing a copper catalyst in solution.

11 Claims, No Drawings

WASTEWATER TREATMENT

BACKGROUND OF THE INVENTION

The instant invention relates to wastewater treatment, and in particular to processes for the oxidative removal of inorganic thiosulfate from wastewater employing peroxygen compounds.

Several manufacturing processes such as petroleum refining, flue gas desulfurisation, the production of inorganic chemicals, canning processes etc generate waste waters containing undesirable high concentration of thiosulfate compounds. In many instances, the presence of thiosulfates has arisen from the partial air oxidation of sulfides that initially were present. Although it is theoretically possible to air oxidise sulfides beyond the intermediate of thiosulfate, in practice such a procedure is not followed because it is excessively expensive as a result of the greatly enhanced excess air requirements and the concomitant ten-fold increase in the oxidation tower volume requirement. However, the residual thiosulfate from the intermediate air oxidation process still exhibits an immediate chemical and biological oxidation demand and in consequence further treatment is necessary before such wastewater can be discharged into public systems.

Hitherto, one of the chemical reagents proposed for the oxidative removal of thiosulfate from aqueous solutions has been hydrogen peroxide, reference appearing in, for example, a Monograph on Hydrogen Peroxide by Schumb, Satterfield and Wentworth and published by Reinhold Publishing Corporation in 1955, p.399, where it was also reported that various catalysts such as molybdate had been investigated for this reaction. More recently, renewed interest has been shown in the use of hydrogen peroxide for this reaction. A paper by Mucenieks and Raleigh, entitled The Use of Hydrogen Peroxide for the Oxidation of Sulfur Chemical Wastes, presented at the 7th Middle Atlantic Industrial Waste Conference at the Rexel University, 1974 indicated, somewhat discouragingly, that the amount of hydrogen peroxide required to oxidise thiosulfate increases more than eight-fold as the pH of the wastewater increased from pH 6 to pH 9. It will be understood that various of the waste waters containing significant concentrations of thiosulfate are not only alkaline, but contain buffers so that the amount of acid required to neutralize such buffered waste waters to below pH 7 often renders such an acidification process uneconomic and attainment of acidic conditions permits toxic hydrogen sulfide gas to be emitted should the wastewater contain residual sulfide. Accordingly, some alternative method for improving the hydrogen peroxide oxidation process of thiosulfate in alkaline conditions would be of practical benefit. In the context of oxidatively removing thiosulfate from aqueous acidic solutions using hydrogen peroxide, certain transition metal catalysts have been suggested including molybdenum and tungsten, and vanadium by W. H. Kibble in articles in respectively Plant Engineering, Vol 33 No. 23 pp.137–140 entitled "Treating Industrial Wastewater with Hydrogen Peroxide" and Industrial Water Engineering, Aug-Sept 1976 pp.6–11 entitled "Peroxide Treatment for Industrial Waste Problems". Disadvantageously, though, Kibble also disclosed that a faster reaction rate under acidic conditions by the addition of such catalysts was achieved only at the expense of substantially increased hydrogen peroxide consumption. Such a substantial increase in peroxide consumption militates against contemplating use of a catalyst in alkaline conditions which have already suffered an eight-fold increase in hydrogen peroxide consumption. When comparative trials were carried out using molybdenum as catalyst for hydrogen peroxide in an alkaline system, it was found marginally to increase the rate of thiosulfate removal over addition of the same amount of hydrogen peroxide but catalyst free; for example, in one test after 1 hour the thiosulfate removal had been increased from about 59% to about 62% by addition of the molybdenum catalyst.

There has also been disclosed in U.S. Pat. No. 4,443,342, Stas et al assigned to Interox, a disclosure that divalent copper can be employed to catalyse the peroxide oxidation of dialkyl disulfides, but this specification teaches the use of a pH of from 2.5 to 6.5 for the aqueous medium, preferably from pH 3 to 5, and further teaches the addition of various types of acids in order to reach the desired pH.

OBJECTS OF THE INVENTION

It is an object of the instant invention to provide a process employing hydrogen peroxide in which the rate of removal of thiosulfate from aqueous alkaline media is accelerated. It is a further object of the instant invention to provide a process in which thiosulfate can be removed to a greater extent from aqueous alkaline media using hyrogen peroxide than in the absence of a catalyst. Other and yet further objects may be apparent from the subsequent disclosure.

SUMMARY OF THE INVENTION

According to the present invention there is provided an improved process for the removal of thiosulfate from an aqueous alkaline solution thereof employing hydrogen peroxide, the improvement consisting essentially in employing a catalytic amount of soluble copper in said thiosulfate-containing solution.

By employing a soluble copper catalyst in a suitable concentration in the alkaline waste water, it is possible to accelerate the removal of thiosulfate therefrom, and improve the extent of its removal or alternatively to obtain similar removal and a similar rate of removal whilst employing a reduced addition of hydrogen peroxide. By employing a process according to the instant invention, it is possible to obtain substantial thiosulfate removal without having to adjust the pH of aqueous alkaline effluents to acidic conditions.

DETAILED DESCRIPTION OF THE INVENTION

The process according to the instant invention is applicable to any aqueous alkaline waste solution of thiosulfate. Accordingly, the thiosulfate concentration in solution prior to treatment is generally within the range of from 1 to 50000 mg/l and indeed in many instances is within the narrower range of 50 to 5000 mg/l prior to treatment according to the instant invention. Such waste solutions are commonly encountered as a result of air oxidation of the effluent from petroleum refining operations. The process is equally applicable to other alkaline waste streams containing thiosulfate ions, such as alkaline waste streams from inorganic sulfur plants, from flue gas desulfurization processes, and from photographic process operations after decomplexing of any complexed metal thiosulfates.

Typically, the amount of hydrogen peroxide introduced is on the basis of a predetermined weight ratio to the concentration of thiosulfate anion in the waste effluent, though allowance would naturally be made also for other hydrogen peroxide demanders should they be present in the waste solution. In practice, the amount of hydrogen peroxide introduced into the solution is at least 0.1 parts per part of thiosulfate present, on a weight basis measured as $S_2O_3$, and usually less than 2 parts per weight of thiosulfate. Use of excess hydrogen peroxide above 2 parts per part of thiosulfate, though chemically feasible, is generally not carried out in practice. In many instances, the weight ratio of hydrogen peroxide to thiosulfate is selected within the weight ratio of 0.25:1 to 1:1 since by so doing a balance can often be achieved between the cost of the process treatment and the significant or substantial reduction of thiosulfate concentration in the effluent. A convenient ratio is often selected within the range of 0.4:1 to 0.9:1 hydrogen peroxide:thiosulfate. Herein, the weight of hydrogen peroxide given is that as 100% hydrogen peroxide. In practice, the hydrogen peroxide is normally introduced in the form of an aqueous solution, up to a concentration of 70% w/w, and usually at least 5% w/w. The hydrogen peroxide solution can be introduced in a variety of different ways. Thus, after the thiosulfate concentration has been determined, the desired amount of hydrogen peroxide in accordance with the foregoing passage can be introduced either in a single shot, in increments, or continuously. The most appropriate method can be chosen at the discretion of the waste treatment operator, and as to some extent depends upon whether the process is to be carried out in batch manner or on a continuous stream, or other continuous or semi-continuous method. Where the effluent treatment is conducted on a flowing stream, the hydrogen peroxide can be introduced continuously into that stream at a predetermined weight ratio or alternatively that given weight ratio can be introduced in a plurality of say 2 to 4 injection points along the flow.

The catalyst employed in the instant invention process can be any soluble copper compound under the conditions of use, for example, copper sulfate, copper chloride, copper acetate, copper nitrate or ammine complexes of copper possibly derived by the complexing of the aforementioned copper compounds with ammonia, indigenous or introduced into the effluent. If desired, at least part of the copper ions may be present as a chelate with, especially, carboxylate chelating agents of which two of the best known sub-classes comprise amino carboxylates and hydroxycarboxylic acids. Naturally, mixtures of any of the copper compounds can be employed. Though solids can be added, it is often easier to employ an aqueous solution. It is most convenient to introduce the copper in cupric form, though introduction in the cuprous form may also be employed. Alternative copper compounds may also be employed, other than those listed hereinabove, provided that they deliver the desired concentration of copper into solution, including, for example various other copper halides and copper salts of carboxylic acids. The concentration of copper introduced is normally at least 0.5 mg/l, calculated as the metal, and normally not more than 500 mg/l. In many instances, the copper concentration is selected within the range of 1 to 50 mg/l, and a convenient range is often from 2 to 20 mg/l. It will be recognized that as the concentration of copper increases, there is a tendency for the rate of removal of thiosulfate to be accelerated, and the overall extent of thiosulfate removal to be increased. It is accordingly a balance between such improvement on one hand and either the increased materials cost of the copper compound to provide the enhanced concentration and/or the cost of subsequent copper removal from the solution should that be demanded by the Authority or Agency controlling or licensing discharge of the effluent. Subsequent copper removal, if desired, can be effected by passing the effluent through a suitable ion exchange bed of for example carboxylate or chelating resins.

In general, the pH of the wastewater has or is brought to a pH of at least pH 8.0 prior to the copper catalyzed removal of thiosulfate therefrom. Usually, the pH of the water does not exceed pH 14, preferably does not exceed pH 12 and most advantageously does not exceed pH 11. In the most preferred processes, the wastewater has a pH of from 8 to 11. Where the wastewater before treatment has a pH higher than that desired, its pH can be brought into the desired or preferred range by introduction of a suitable quantity of an acid, in particular a mineral acid such as sulfuric, phosphoric or nitric acids. It will be recognized that advantageously, in many instances the natural pH of the effluent prior to treatment falls within the range pH 8 to 11, so that pH adjustment is neither necessary nor need be contemplated.

Most conveniently, the instant invention process can be carried out at any temperature from ambient upwards at which the aqueous effluent remains in liquid form, though as a matter of practice, it is often advantageous to employ a temperature of below 75° C., so as to minimize wasteful hydrogen peroxide decomposition. In many instances the process is carried out at a temperature of up to 60° C. such as from 25° C. to 60° C. Once again, it is at the discretion of the process operator as to whether or not heat is supplied to either generate an elevated temperature or maintain it or to permit the effluent to attain its natural temperature, balancing on the one hand the somewhat faster rate of thiosulfate removal occasioned by a higher temperature and thus the decreased holding time for the effluent against on the other hand the cost of providing such heat. Such a balance will naturally depend upon local circumstances, for example whether or not waste heat is available from some concurrently operated process or other source nearby.

In many desirable embodiments, the combination of process features employed comprises provision of a pH for the wastestream of from pH 8 to 12, a soluble copper concentration of from 0.1 to 100 mg/l, a total hydrogen peroxide addition of from 0 1 to 2 parts by weight of thiosulfate in solution, said thiosulfate often itself being present in a concentration of from 1 to 10000 mg/l, the solution temperature being maintained within the range of from ambient to 75° C.

In a particularly preferred combination of process parameters, the process is effected at a pH of from 8.0 to 11.0, employing a soluble copper catalyst at a concentration of from 2 to 20 mg/l, and a hydrogen peroxide:thiosulfate weight ratio selected in the range of 0.4:1 to 0.9:1 by weight at a temperature of from 25° C. to 60° C.

One further process variable is the holding time for the effluent during treatment. Depending upon the foregoing parameters, this can vary from a very short period of a few minutes up to a comparatively long period of several hours. Expressed numerically, most embodiments of the present invention employ a holding time in the range of from 5 minutes to 10 hours. In at least some embodiments, the instant invention process enables substantial significant removal of thiosulfate to be achieved within a holding period of an hour or even 15 to 30 minutes, whereas by comparison, not only did the uncatalyzed system result in substantially less thiosulfate removal from the same addition of hydrogen peroxide, but it also reached its maximum removal substantially more slowly, often taking at least double the length of time of the catalysed system or longer. Of the various ways of assessing when it is safe to discharge the thiosulfate-depleted effluent, one method relies upon monitoring the redox potential of the solution, for example, by means of a standard calomel electrode probe, which shows a distinct positive potential shift as the thiosulfate is eliminated, though precautions may be advantageous to avoid/remove any interfering depositions on the probe. Other methods involve carrying out a prior series of ranging trials and on the basis of them ceasing the reaction after a predetermined interval. Yet others employ analysis of the solution for residual hydrogen peroxide, and discharging the effluent when nil residual hydrogen peroxide is found, though these preferably employ also ranging trials to assess the hydrogen peroxide requirement beforehand. In these latter methods, of course, the residual thiosulfate concentration can be determined also and further hydrogen peroxide can be introduced as in the aforedescribed manner and process conditions in order to further reduce the thiosulfate level.

Specific embodiments of the instant invention will now be described in some detail by way of illustration and example only. It will be understood that the skilled artisan can modify these embodiments in accordance with the foregoing disclosure and his general skill and knowledge without departing from the spirit and scope of the instant invention.

COMPARISONS AND EXAMPLES

All the Comparisons and Examples employed the general procedure as follows; except where differences are indicated.

Samples (800 g) of an aqueous alkaline solution containing a measured concentration of thiosulfate were brought to predetermined temperature using a water bath, and held at that temperature thereafter. A specified amount of hydrogen peroxide was introduced as a 5% w/w aqueous solution and in the Examples a copper catalyst was also introduced. Periodically small samples were withdrawn from the solution and analyzed for residual hydrogen peroxide, employing the standard potassium titanium oxalate test procedure on extracted samples. When the test indicated that no hydrogen peroxide remained in solution, 50 ml aliquots were removed from each sample, adjusted to pH 4 and the thiosulfate concentration therein measured by a standard iodine titration, employing a starch indicator.

Comparisons and Examples C1 to C22

The process conditions and results obtained in Comparison C1 through to Example 22 are summarized in Table 1. For Comparison C1 and Example 2, a synthetic thiosulfate solution was prepared by dissolving sodium thiosulfate pentahydrate (1167 mg/l) into demineralized water and adjusting its pH to pH 10.0 with sodium hydroxide. Aliquots each of 800 g were charged into separate beakers and brought to 37° C. in a water bath. Aqueous hydrogen peroxide (5% w/w, 4.8 mls) were added to each sample providing hydrogen peroxide at a concentration of 300 mg/and in Example 2, copper sulfate pentahydrate (3931 mg/l, 8 mls) was also added.

In Comparisons C3 through to Example 6 the synthetic thiosulfate solution employed was as per Comparison C1 and Example 2, with the exception that in Comparison C5 and Example 6, the solution additionally contained ammonia at a concentration of 25 mg/l by introduction of ammonium hydroxide solution (0.6N, 1.0 ml). This set of experiments was conducted at 40° C. and only 1.2 ml hydrogen peroxide introduced, yielding 75 mg/l concentration in each solution, and otherwise the conditions of C1 were followed in C3 and C5, and the conditions of Example 2 in 4 and 6.

In Comparisons C7 through to Example 12, the thiosulfate solution employed was a sample of an air oxidizer effluent containing 245 mg/l thiosulfate divided into six equal aliquots. The solution also contained ammonia at a concentration of 2510 mg/l (calculated as $NH_3$) and iron at 0.6 mg/l, calculated as the metal. The solution had a pH of 9.5 and was free from sulfide. All the samples were heated to 37° C. over a water bath and the three sets of odd numbered Comparisons and even numbered Examples were dosed with 0.3, 0.6 or 0.9 ml respectively of hydrogen peroxide solution (5% w/v) and with nil catalyst in the Comparisons and cupric sulfate solution (2.51 g/1, 2.0 ml) in the Examples.

In Comparison 13 through to Example 16, the conditions used in Comparison 9 and Example 10 were repeated, but using a range of copper catalyst concentrations, employing respectively, 0, 0.2, 1.0 and 2.0 ml of the cupric sulfate solution and with the exception also that a different sample of effluent was used in which the thiosulfate concentration before hydrogen peroxide oxidation was 451 mg/l.

Comparisons and Examples 17 to 22

The conditions used in Comparison 9/Example 10 were repeated in respect of the three sets each comprising an odd numbered Comparison and an even numbered Example in that the $H_2O_2:S_2O_3^{2-}$ weight ratio was retained at 0.6:1, the catalyst when added provided 10 mg/l copper in solution and the destruction was carried out at 37° C. The thiosulfate concentration before treatment for the three sets was respectively 298 mg/l, 222 mg/l and 117 mg/l. Each solution contained ammonia at a concentration of at least 1500 mg/l calculated as $NH_3$.

In Table 1, all comparisons are prefixed by the letter C and each precedes immediately the Example with which it can be compared, except for Comparison C13 which serves as comparison for all of Examples 14 to 16. The term 'residence time' indicates the time that hydrogen peroxide remained in the solution, a + sign indicatinq that the time exceeded the figure quoted and a — sign that it was less than the subsequent figure. The terms 'Gain' and 'Relative Kill Ratio' are both derived from the measured '% Removed' given in the preceding column of Table 1. If % Removed in the appropriate comparison, i.e. copper absent, is represented by $R_{comp}$ and % Removed in the Example, i.e. copper present, is represented by $R_{EX}$, then Gain $= (R_{EX}) - (R_{comp})$ and Relative Kill Ratio $= (R_{EX})/(R_{comp})$.

TABLE 1

| $H_2O_2$ introduction | | |
|---|---|---|
| weight ratio | | Copper |

TABLE 1-continued

| Ex/Comp No. | concentration mg/l | $H_2O_2$:$S_2O_3^{2-}$ | pH | Temp °C. | catalyst conc mg/l |
|---|---|---|---|---|---|
| C1 | 300 | 0.57 | 10.0 | 37 | 0 |
| 2 | 300 | 0.57 | 10.0 | 37 | 10 |
| C3 | 75 | 0.14 | 10.0 | 40 | 0 |
| 4 | 75 | 0.14 | 10.0 | 40 | 10 |
| C5 | 75 | 0.14 | 10.0 | 40 | 0 |
| 6 | 75 | 0.14 | 10.0 | 40 | 10 |
| C7 | 75 | 0.31 | 9.5 | 37 | 0 |
| 8 | 75 | 0.31 | 9.5 | 37 | 10 |
| C9 | 150 | 0.61 | 9.5 | 37 | 0 |
| 10 | 150 | 0.61 | 9.5 | 37 | 10 |
| C11 | 225 | 0.92 | 9.5 | 37 | 0 |
| 12 | 225 | 0.92 | 9.5 | 37 | 10 |
| C13 | 200 | 0.60 | 9.8 | 37 | 0 |
| 14 | 200 | 0.60 | 9.8 | 37 | 1 |
| 15 | 200 | 0.60 | 9.8 | 37 | 5 |
| 16 | 200 | 0.60 | 9.8 | 37 | 10 |
| C17 | 180 | 0.60 | 9.7 | 37 | 0 |
| 18 | 180 | 0.60 | 9.7 | 37 | 10 |
| C19 | 134 | 0.60 | 9.6 | 37 | 0 |
| 20 | 134 | 0.60 | 9.6 | 37 | 10 |
| C21 | 71 | 0.60 | 9.8 | 37 | 0 |
| 22 | 71 | 0.60 | 9.8 | 37 | 10 |

| Ex/ Comp No. | Residence Time mins | | Thiosulfate concentration | | % Removed | | Relative Kill Ratio |
|---|---|---|---|---|---|---|---|
| | | | Initial mg/l | Residual mg/l | R | Gain | |
| C1 | +120 | | 525 | 287 | 45 | — | — |
| 2 | +5 | −12 | 525 | 147 | 72 | 27 | 1.6 |
| C3 | +180 | | 525 | 490 | 7 | — | — |
| 4 | | −15 | 525 | 354 | 33 | 26 | 4.7 |
| C5 | +180 | | 525 | 480 | 9 | — | — |
| 6 | | −15 | 525 | 305 | 42 | 33 | 4.7 |
| C7 | +45 | −60 | 245 | 149 | 39 | — | — |
| 8 | +5 | −10 | 245 | 47 | 81 | 42 | 2.1 |
| C9 | +60 | −90 | 245 | 70 | 61 | — | — |
| 10 | +10 | −15 | 245 | 21 | 91 | 30 | 1.5 |
| C11 | +90 | −120 | 245 | 54 | 78 | — | — |
| 12 | +10 | −15 | 245 | 16 | 94 | 16 | 1.2 |
| C13 | 180 | | 451 | 254 | 44 | — | — |
| 14 | +15 | −30 | 451 | 174 | 62 | 18 | 1.4 |
| 15 | +5 | −10 | 451 | 132 | 71 | 27 | 1.6 |
| 16 | +5 | | 451 | 113 | 75 | 31 | 1.7 |
| C17 | +120 | −180 | 298 | 154 | 48 | — | — |
| 18 | +15 | | 298 | 61 | 79 | 31 | 1.6 |
| C19 | +30 | −60 | 222 | 68 | 69 | — | — |
| 20 | +15 | | 222 | 23 | 90 | 21 | 1.3 |
| C21 | +60 | −180 | 117 | 47 | 60 | — | — |
| 22 | +15 | | 117 | 16 | 86 | 26 | 1.4 |

From Table 1 it can be seen that in all instances, the presence of the catalyst not only accelerated the destruction of thiosulfate but also resulted in a more efficient utilization of hydrogen peroxide for the purpose, a higher removal of thiosulfate occurring per unit addition of hydrogen peroxide in the presence of the copper. This can be seen most readily in the Relative Kill Ratio term which not unnaturally reflects the fact that when hydrogen peroxide in the absence of catalyst is relatively ineffective, there is greater potential for the catalyst to demonstrate its benefits. When viewed in an alternative fashion, it will be seen by comparing, for example, Comparison 11 with Example 8 that very much more hydrogen peroxide is required to obtain substantially the same extent of thiosulfate removal in the absence of the catalyst. Examples 14 to 16 demonstrate the effect of increasing the concentration of copper catalyst, and further demonstrate that substantial catalysis is evident even at as low catalyst concentration as around 1 mg/l. This demonstrates further that this instant invention can be applied with advantage even where stringent constraints are placed upon the levels of copper in discharged effluents.

It will also be observed from Table 1 that in the presence of the copper, the rate of thiosulfate removal was markedly enhanced, in that many of the Examples have completely employed the hydrogen peroxide within 15 minutes whereas in the absence of the catalyst, complete usage of the hydrogen peroxide in some instances took in excess of 3 hours.

A plant scale trial assessment was carried out employing introduction of copper catalyst at a concentration of approximately 10 mg/l copper into a waste air oxidiser effluent which contained thiosulfate at a concentration which varied over the period of time of the trial between about 200 and about 1200 mg/l thiosulfate and had a temperature in the region of 40 to 50° C. and a pH of around pH 9.9 to around 10.4. The trial confirmed in broad measure the applicability of laboratory scale Examples to plant scale. The dosing of hydrogen peroxide ranged within about 0.25:1 up to about 1:1 based w/w on the thiosulfate present. The presence of the catalyst was found substantially to improve the extent of thiosulfate removed (Gain) and the efficiency of its removal per unit of hydrogen peroxide introduced. Depending upon the two methods of sampling employed (composite and grab sampling), the mean Relative Kill Ratio was respectively 1.6 and 1.88. It can be seen that even though the two methods produced a slightly different absolute figures, both were substantially in excess of 1 so that both show the beneficial effect of the catalyst, and both indicate that in the presence of the copper catalyst, hydrogen peroxide introduction could be reduced to only 60% of its former figure to achieve the same extent of thiosulfate removal.

Comparison 23 through to Example 28

These Comparisons and Examples were conducted at 37° C. the aqueous alkaline thiosulfate solution employed in C23 through to Example 25 was a further sample of air oxidizer effluent, containing a total of 39.2 mg/l (calculated as S) of thiosulfate and any other reducer present as measured by the standard iodine test aforementioned, called total reducers for short. Comparison C26 to Example 28 likewise employed a further sample of effluent containing a total of 466 mg/l total reducers (calculated as S). Hydrogen peroxide was introduced into both samples at a weight ratio of 1:1 to the total reducers, calculated as S. In Comparisons C23 and C26 no catalyst was added, in C24 and C27 a soluble molybdenum salt was introduced to provide 3 mg/l molybdenum in solution and in Examples 25 and 28 a soluble copper salt was introduced to provide 10 mg/l. Samples from the solutions were periodically removed for thiosulfate (total reducers) analysis instead of waiting until a nil hydrogen peroxide residue was found. The results obtained upon the 1 hour samples are shown in Table 2 below.

TABLE 2

| Ex/Comp No. | Catalyst | Residual reducers as S mg/l | % S removed |
|---|---|---|---|
| C23 | None | 37.6 | 4 |
| C24 | Molybdenum | 32.6 | 17 |
| 25 | Copper | 2.6 | 94 |
| C26 | None | 190 | 59 |
| C27 | Molybdenum | 176 | 62 |
| 28 | Copper | 11 | 98 |

From Table 2 it can be seen clearly that the copper catalyst was far more successful than either the molybdenum catalyst or no catalyst in lowering the thiosulfate (total reducers) content of the waste effluents.

That which we claim is:

1. In a process for the removal of thiosulfate from an aqueous alkaline solution thereof having a pH of at least 8, by introduction thereinto of an effective amount of aqueous hydrogen peroxide the improvement consisting essentially in providing in said solution a catalytic amount of a water soluble copper catalyst, whereby the rate and extent of thiosulfate removal are improved compared with introduction of the same amount of hydrogen peroxide uncatalyzed.

2. A process according to claim 1 in which the aqueous solution has a pH of from pH 8 to 12.

3. A process according to claim 1 in which the copper catalyst is present at a concentration of at least 0.5 mg/l up to 500 mg/l.

4. A process according to claim 3 in which the copper catalyst is present at a concentration of from 2 to 20 mg/l.

5. A process according to claim 1 in which the copper catalyst is introduced in the form of copper sulfate, chloride, nitrate, or acetate 6. A process according to claim 1 in which hydrogen peroxide is introduced at a weight ratio to the thiosulfate of from 0.1:1 to 2:1.

7. A process according to claim 1 in which the solution has or is brought to a temperature of from ambient to 60° C. at the commencement of the thiosulfate removal treatment and is thereafter maintained within that temperature range or allowed to attain its natural temperature.

8. A process according to claim 1 in which the thiosulfate solution resulted from the partial air oxidation of a waste sulfide solution.

9. A process according to claim 1 in which a soluble copper salt is introduced to provide 0.1 to 100 mg/l copper and hydrogen peroxide is introduced in a total amount of from 0.1 to 2 parts per weight of thiosulfate at a temperature of from ambient to 75° C. into a waste effluent that has a pH of from pH 8 to 12 and contains 1 to 10000 mg/l thiosulfate.

10. A process according to claim 9 in which the copper concentration is from 2 to 20 mg/l, the hydrogen peroxide addition of from 0.4 to 0.9 parts per part by weight of thiosulfate at a pH of from pH 8 to 11 and at a temperature of 25° C. to 60° C.

11. A process according to claim 10 in which the solution is retained for at least 15 minutes reaction before being discharged.

* * * * *